United States Patent
Chitti et al.

(10) Patent No.: US 9,923,965 B2
(45) Date of Patent: Mar. 20, 2018

(54) STORAGE MIRRORING OVER WIDE AREA NETWORK CIRCUITS WITH DYNAMIC ON-DEMAND CAPACITY

(71) Applicant: INTERNATIONAL BUSINESS MACHINES CORPORATION, Armonk, NY (US)

(72) Inventors: Mark V. Chitti, Richmond, KY (US); Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 14/731,834

(22) Filed: Jun. 5, 2015

(65) Prior Publication Data

US 2016/0359968 A1    Dec. 8, 2016

(51) Int. Cl.
 *G06F 15/16*    (2006.01)
 *H04L 29/08*    (2006.01)
 (Continued)

(52) U.S. Cl.
 CPC ...... *H04L 67/1095* (2013.01); *H04L 41/0896* (2013.01); *H04L 43/0888* (2013.01); *H04L 43/16* (2013.01)

(58) Field of Classification Search
 CPC ............. H04L 67/1095; H04L 41/0896; H04L 43/0888; H04L 43/16

(Continued)

(56) References Cited

U.S. PATENT DOCUMENTS

| | | |
|---|---|---|
| 4,144,414 A | 3/1979 | Nicholas |
| 6,205,477 B1 | 3/2001 | Johnson et al. |

(Continued)

FOREIGN PATENT DOCUMENTS

WO    2014021839 A1    2/2014

OTHER PUBLICATIONS

Hwang, Wen-Shyang, et al.; Design and Implementation of an iLVM Mechanism for Remote Mirror; KUASIR College of Electrical Engineering and Computer Science, Department of Electrical Engineering, Journal of Internet Technology, 7(2); Apr. 2006; pp. 169-176.

(Continued)

*Primary Examiner* — Melvin H Pollack
(74) *Attorney, Agent, or Firm* — William Hartwell; Matthew M. Hulihan; Heslin Rothenberg Farley & Mesiti P.C.

(57) ABSTRACT

An approach is provided for managing an allocation of a bandwidth of a dedicated channel in a network being utilized by an application performing a replication of data from a first to a second storage resource. Checks of parameters specified by the application are determined. The parameters include, but are not limited to, average compression ratio, compression ratio trend, throughput, throughput trend, and round trip time. Respective high and low threshold values for the parameters are determined. At least one of the checks of the parameters is executed, which determines a violation of a threshold value for one of the parameters. If the violation of the high threshold value is determined, an increase in the bandwidth is triggered. If the violation of the low threshold value is determined, a decrease in the bandwidth is triggered.

20 Claims, 3 Drawing Sheets

(51) Int. Cl.
*H04L 12/24* (2006.01)
*H04L 12/26* (2006.01)

(58) Field of Classification Search
USPC .......................................................... 709/223
See application file for complete search history.

(56) References Cited

U.S. PATENT DOCUMENTS

| | | | |
|---|---|---|---|
| 6,389,432 | B1 | 5/2002 | Pothapragada et al. |
| 6,418,139 | B1 | 7/2002 | Akhtar |
| 6,563,829 | B1 | 5/2003 | Lyles et al. |
| 6,937,566 | B1 | 8/2005 | Forslow |
| 7,089,294 | B1 | 8/2006 | Baskey et al. |
| 7,103,906 | B1 | 9/2006 | Katz et al. |
| 7,542,420 | B1 | 6/2009 | Mokhtar et al. |
| 7,590,746 | B2 * | 9/2009 | Slater ................. H04L 41/0896 709/226 |
| 7,685,310 | B2 | 3/2010 | Ueoka et al. |
| 7,808,918 | B2 | 10/2010 | Bugenhagen |
| 7,844,967 | B2 | 11/2010 | Kelly |
| 8,412,824 | B1 | 4/2013 | Schiff |
| 8,464,335 | B1 | 6/2013 | Sinha et al. |
| 8,660,008 | B2 * | 2/2014 | Babiarz .............. H04L 41/5019 370/235 |
| 8,762,505 | B2 | 6/2014 | Kutan et al. |
| 8,788,690 | B2 | 7/2014 | Short et al. |
| 8,793,343 | B1 * | 7/2014 | Sorenson .......... G06F 17/30203 709/219 |
| 8,799,320 | B2 | 8/2014 | Chan et al. |
| 8,873,753 | B2 * | 10/2014 | Parker ..................... H04L 63/20 380/250 |
| 9,026,671 | B2 * | 5/2015 | Gillies ................ H04L 12/1881 370/230 |
| 9,172,771 | B1 * | 10/2015 | Gross ...................... H04L 69/04 |
| 9,207,993 | B2 * | 12/2015 | Jain ....................... G06F 9/5094 |
| 9,330,156 | B2 * | 5/2016 | Satapathy ......... G06F 17/30575 |
| 9,495,251 | B2 * | 11/2016 | Kottomtharayil ... G06F 11/1448 |
| 9,535,776 | B2 * | 1/2017 | Klose .................... G06Q 10/06 |
| 9,596,144 | B2 * | 3/2017 | Anderson ............. H04L 41/142 |
| 2002/0049841 | A1 | 4/2002 | Johnson |
| 2002/0101869 | A1 | 8/2002 | Garcia-Luna-Aceves et al. |
| 2002/0112113 | A1 | 8/2002 | Karpoff et al. |
| 2002/0124262 | A1 | 9/2002 | Basso et al. |
| 2002/0133613 | A1 | 9/2002 | Teng et al. |
| 2002/0144174 | A1 | 10/2002 | Nwabueze |
| 2002/0181394 | A1 | 12/2002 | Partain et al. |
| 2002/0194324 | A1 | 12/2002 | Guha |
| 2003/0021338 | A1 | 1/2003 | Mazzoni |
| 2003/0037061 | A1 | 2/2003 | Sastri et al. |
| 2003/0069963 | A1 | 4/2003 | Jayant et al. |
| 2003/0110263 | A1 | 6/2003 | Shillo |
| 2003/0120666 | A1 | 6/2003 | Tacaille et al. |
| 2003/0126132 | A1 | 7/2003 | Kavuri et al. |
| 2003/0172130 | A1 | 9/2003 | Fruchtman et al. |
| 2003/0202477 | A1 | 10/2003 | Zhen et al. |
| 2004/0098671 | A1 | 5/2004 | Graham et al. |
| 2004/0198360 | A1 | 10/2004 | Kotzin |
| 2004/0199566 | A1 | 10/2004 | Carlson et al. |
| 2004/0215644 | A1 | 10/2004 | Edwards, Jr. et al. |
| 2004/0215749 | A1 | 10/2004 | Tsao |
| 2004/0246972 | A1 | 12/2004 | Wang et al. |
| 2005/0033935 | A1 | 2/2005 | Manbert et al. |
| 2005/0125593 | A1 | 6/2005 | Karpoff et al. |
| 2005/0129000 | A1 | 6/2005 | Sivakumar et al. |
| 2005/0154841 | A1 | 7/2005 | Sastri et al. |
| 2005/0273451 | A1 | 12/2005 | Clark et al. |
| 2005/0289618 | A1 | 12/2005 | Hardin |
| 2006/0129562 | A1 | 6/2006 | Pulamarasetti et al. |
| 2006/0171390 | A1 | 8/2006 | LaJoie |
| 2006/0206682 | A1 | 9/2006 | Manbert et al. |
| 2006/0218369 | A1 | 9/2006 | Fujino |
| 2006/0248231 | A1 | 11/2006 | O'Rourke et al. |
| 2006/0265558 | A1 | 11/2006 | Fujino |
| 2007/0022264 | A1 | 1/2007 | Bromling et al. |
| 2007/0065078 | A1 | 3/2007 | Jiang |
| 2007/0106798 | A1 | 5/2007 | Masumitsu |
| 2007/0195765 | A1 | 8/2007 | Heissenbuttel et al. |
| 2007/0198627 | A1 | 8/2007 | Bozionek et al. |
| 2008/0109450 | A1 | 5/2008 | Clark et al. |
| 2008/0115144 | A1 | 5/2008 | Tsao |
| 2008/0140850 | A1 | 6/2008 | Gade et al. |
| 2008/0259798 | A1 | 10/2008 | Loh |
| 2008/0320097 | A1 | 12/2008 | Sawicki et al. |
| 2009/0007199 | A1 | 1/2009 | JaJoie |
| 2009/0061853 | A1 | 3/2009 | Anschutz |
| 2009/0100163 | A1 | 4/2009 | Tsao |
| 2009/0172782 | A1 | 7/2009 | Taglienti et al. |
| 2009/0187668 | A1 | 7/2009 | Arendt et al. |
| 2009/0204711 | A1 | 8/2009 | Binyamin |
| 2009/0217326 | A1 | 8/2009 | Hasek |
| 2009/0240867 | A1 | 9/2009 | Shibayama et al. |
| 2009/0271589 | A1 | 10/2009 | Karpoff et al. |
| 2010/0257602 | A1 | 10/2010 | Kettler et al. |
| 2010/0268632 | A1 | 10/2010 | Rosenthal |
| 2010/0274656 | A1 | 10/2010 | Genschel |
| 2010/0306382 | A1 | 12/2010 | Cardosa |
| 2010/0306445 | A1 | 12/2010 | Dake |
| 2010/0332401 | A1 | 12/2010 | Prahlad et al. |
| 2011/0004550 | A1 | 1/2011 | Giordano et al. |
| 2011/0022697 | A1 | 1/2011 | Huh |
| 2011/0078227 | A1 | 3/2011 | McAloon et al. |
| 2011/0083037 | A1 | 4/2011 | Bocharov et al. |
| 2011/0125889 | A1 | 5/2011 | Tsao |
| 2011/0158653 | A1 | 6/2011 | Mazed |
| 2011/0208710 | A1 | 8/2011 | Lesavich |
| 2011/0218770 | A1 | 9/2011 | Ii |
| 2011/0282928 | A1 | 11/2011 | Ball et al. |
| 2011/0293278 | A1 | 12/2011 | Mazed |
| 2012/0023545 | A1 | 1/2012 | Qu |
| 2012/0063353 | A1 | 3/2012 | Schlenk |
| 2012/0072600 | A1 | 3/2012 | Richardson et al. |
| 2012/0109705 | A1 | 5/2012 | Belady et al. |
| 2012/0131309 | A1 | 5/2012 | Johnson |
| 2012/0137173 | A1 | 5/2012 | Burshan et al. |
| 2012/0180080 | A1 | 7/2012 | LaJoie |
| 2012/0201130 | A1 | 8/2012 | Liv et al. |
| 2012/0210381 | A1 | 8/2012 | Ozawa |
| 2012/0216259 | A1 | 8/2012 | Okamoto et al. |
| 2012/0331221 | A1 | 12/2012 | Cho |
| 2013/0003538 | A1 | 1/2013 | Greenberg et al. |
| 2013/0007254 | A1 | 1/2013 | Fries |
| 2013/0031258 | A1 | 1/2013 | Mukai et al. |
| 2013/0081014 | A1 | 3/2013 | Kadatch |
| 2013/0185404 | A1 | 7/2013 | Patel et al. |
| 2013/0204963 | A1 | 8/2013 | Boss et al. |
| 2013/0205002 | A1 | 8/2013 | Wang et al. |
| 2013/0212282 | A1 | 8/2013 | Pulier |
| 2013/0212422 | A1 | 8/2013 | Bauer et al. |
| 2013/0227009 | A1 | 8/2013 | Padmanaban et al. |
| 2013/0242903 | A1 | 9/2013 | Narkar |
| 2013/0254383 | A1 | 9/2013 | Wray |
| 2013/0254407 | A1 | 9/2013 | Pijewski |
| 2013/0268672 | A1 | 10/2013 | Justafort |
| 2013/0282795 | A1 | 10/2013 | Tsao |
| 2014/0040343 | A1 | 2/2014 | Nickolov et al. |
| 2014/0057592 | A1 | 2/2014 | Chetlur |
| 2014/0068076 | A1 | 3/2014 | Dasher et al. |
| 2014/0075029 | A1 | 3/2014 | Lipchuk |
| 2014/0082301 | A1 | 3/2014 | Barton et al. |
| 2014/0082681 | A1 | 3/2014 | Brown et al. |
| 2014/0115189 | A1 | 4/2014 | Ao et al. |
| 2014/0129819 | A1 | 5/2014 | Huang et al. |
| 2014/0180664 | A1 * | 6/2014 | Kochunni ........... G06F 11/3442 703/21 |
| 2014/0188801 | A1 * | 7/2014 | Ramakrishnan .. G06F 17/30575 707/634 |
| 2014/0207968 | A1 | 7/2014 | Kumar et al. |
| 2014/0233587 | A1 | 8/2014 | Liv et al. |
| 2014/0244835 | A1 | 8/2014 | Lopez Alvarez |
| 2014/0258535 | A1 | 9/2014 | Zhang |
| 2014/0281015 | A1 | 9/2014 | Orona et al. |
| 2014/0289205 | A1 | 9/2014 | Shigeta |
| 2014/0344879 | A1 | 11/2014 | Phillips et al. |

(56) References Cited

U.S. PATENT DOCUMENTS

| | | |
|---|---|---|
| 2014/0365658 A1 | 12/2014 | Lang et al. |
| 2015/0006614 A1 | 1/2015 | Suryanarayanan |
| 2015/0019740 A1* | 1/2015 | Zhao ................ H04L 41/5022 709/226 |
| 2015/0026793 A1 | 1/2015 | Li |
| 2015/0046960 A1 | 2/2015 | Hardin |
| 2015/0067093 A1 | 3/2015 | Sawicki et al. |
| 2015/0067744 A1 | 3/2015 | Furtwangler |
| 2015/0082362 A1 | 3/2015 | Hasek |
| 2015/0117198 A1 | 4/2015 | Menezes et al. |
| 2015/0134731 A1 | 5/2015 | Wang et al. |
| 2015/0134830 A1 | 5/2015 | Popa |
| 2015/0156204 A1 | 6/2015 | Resch |
| 2015/0172070 A1 | 6/2015 | Csaszar |
| 2015/0195173 A1 | 7/2015 | Gupta et al. |
| 2015/0222445 A1 | 8/2015 | Iyer et al. |
| 2015/0234636 A1 | 8/2015 | Barnes, Jr. |
| 2015/0235308 A1 | 8/2015 | Mick et al. |
| 2015/0288919 A1 | 10/2015 | Labosco |
| 2016/0066261 A1 | 3/2016 | Nasielski et al. |
| 2016/0197835 A1* | 7/2016 | Luft ................ H04L 12/46 709/223 |
| 2016/0197848 A1 | 7/2016 | Bhide |
| 2016/0231948 A1 | 8/2016 | Gupta et al. |
| 2017/0076057 A1* | 3/2017 | Burton ................ G06F 19/322 |
| 2017/0090773 A1* | 3/2017 | Vijayan ................ G06F 3/065 |

OTHER PUBLICATIONS

XRoads Networks; Dynamic Bandwidth Management; Retrievied from the Internet Nov. 11, 2014; URL: http://dualwanfirewalls.com/ubm/solutions/dynamic_bandwidth_control.xrn; 4 pages.

IBM; Internal Model for Dynamically-Virtualizing the Storage of Data Between a RAID-6 and a Mirror; IP.com; IP.com No. 000160533; Nov. 19, 2007; 5 pages.

Weil, Sage; Reliable, Scalable, and High-Performance Distributed Storage: Distributed Object Storage; IP.com; IP.com No. 000234957; Feb. 19, 2014; 11 pages.

List of IBM Patents or Patent Applications Treated as Related, Dec. 11, 2015, pp. 1-2.

Office Action in U.S. Appl. No. 14/952,449, dated Jul. 25, 2017, pp. 1-41.

Office Action in U.S. Appl. No. 14/952,456, dated May 17, 2017, pp. 1-25.

Office Action in U.S. Appl. No. 14/952,463, dated May 22, 2017, pp. 1-27.

Office Action in U.S. Appl. No. 14/952,466, dated Jun. 26, 2017, pp. 1-35.

Elali, H., SAN Zone Reuse in Port Allocation, https://coprhd. atlassian.net/wiki/spaces/COP/pages/8618000/ SAN+Zone+Reuse+in+Port+Allocation, Oct. 15, 2015 (6 pages).

* cited by examiner

STORAGE MIRRORING OVER WIDE AREA NETWORK CIRCUITS WITH DYNAMIC ON-DEMAND CAPACITY

TECHNICAL FIELD

The present invention relates to data storage management, and more particularly to managing bandwidth for data mirroring and data replication.

BACKGROUND

Dynamic bandwidth is an evolving technology for provisioning wide area networks (WANs). Database mirroring (i.e., data mirroring) is a requirement over multiple industries needing real time replication of production data. Bandwidth is expensive and the replication is "time critical." Bandwidth is usually provisioned to meet a projected peak data demand and paid for over the course of a contract. Since peak demand occurs infrequently, bandwidth is over-provisioned for a significant amount of time. The over-provisioning of the bandwidth results in an extra cost to a customer who is paying for bandwidth over the course of a contract, because over time, the customer is usually paying for capacity that is not being used. Furthermore, since a projected peak data demand is utilized in bandwidth provisioning, a business performing better than expected may cause an actual peak data demand to be higher than the projected peak data demand, which results in the application slowing down due to an inability to satisfy the actual demand.

Dynamic Bandwidth Management services typically provide a bandwidth management technique in which bandwidth control is performed by a central network component that monitors traffic from multiple applications and guarantees bandwidth for critical applications while traffic for low priority applications is blocked.

Accordingly, there is a need to determine when and how much WAN bandwidth is to be allocated for an application which performs data mirroring or data replication via a dedicated channel, in order to avoid over-provisioning and under-provisioning bandwidth and without affecting the performance of the application.

BRIEF SUMMARY

In a first embodiment, the present invention provides a method of managing an allocation of a bandwidth of a dedicated channel in a network being utilized by an application performing a replication of data from a first storage resource to a second storage resource. The method includes a computer determining checks of parameters specified by the application. The parameters include an average compression ratio of the data over a first amount of time, a trend of the average compression ratio of the data, an average throughput over a second amount of time, a trend of the average throughput, and a round trip time of the data in the replication being sent from the first storage resource to the second storage resource. The method further includes the computer determining respective high and low threshold values for the parameters. The method further includes the computer executing at least one of the checks of the parameters, which determines a violation of a high or low threshold value for one of the parameters. The method further includes: (1) if the violation of the high threshold value is determined, the computer triggering an increase in the bandwidth, or (2) if the violation of the low threshold value is determined, the computer triggering a decrease in the bandwidth. The increase is a first specified amount associated with the high threshold value. The decrease is a second specified amount associated with the low threshold value. The method advantageously optimizes bandwidth allocation for data replication to avoid over-provisioning and under-provisioning of bandwidth for the replication.

In a first aspect of the first embodiment, the method may further include in response to the step of executing the at least one of the checks of the parameters, the computer determining the violation of the high threshold value, which indicates an increase in a current demand or an expected demand for the bandwidth. The method may further include in response to the step of triggering the increase in the bandwidth, the computer sending a request to a transport device of a network service provider to dynamically increase the bandwidth during the replication, which avoids a slowdown of the application as a result of the increase in the current or expected demand. In the first aspect, the method advantageously avoids negatively affecting the performance of the application as a result of the increase in the current or expected demand.

In a second aspect of the first embodiment, the method may further include in response to the step of executing the at least one of the checks of the parameters, the computer determining the violation of the low threshold value, which indicates a decrease in a current demand or an expected demand for the bandwidth. The method may further include in response to the step of triggering the decrease in the bandwidth, the computer sending a request to a transport device of a network service provider to dynamically decrease the bandwidth during the replication, which avoids an over-provisioning of the bandwidth as a result of the decrease in the current or expected demand, and which reduces a cost of the replication. In the second aspect, the method advantageously reduces the cost of the replication by avoiding an over-provisioned bandwidth situation in which a customer pays for bandwidth for the replication that is not actually used.

In a third aspect of the first embodiment, the step of determining the checks may include determining the checks of parameters further including an amount of network buffers in an input/output (I/O) device being used in the replication, buffer credits remaining on the second storage resource, a transfer time required to move the data from the first storage resource to the second storage resource, an amount of new data included in the data being transferred in the replication, a response time of a communication port of the I/O device, and a recovery point objective for the data. In the third aspect, the method advantageously utilizes additional parameter checks to more accurately determine current and expected demand for bandwidth for the data replication, where the current and expected demand becomes a more accurate basis for dynamically allocating bandwidth to avoid over-provisioning and under-provisioning the bandwidth.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of managing an allocation of a bandwidth of a dedicated channel in a network being utilized by an application performing a replication of data from a first storage resource to a second storage resource. The method includes the computer system determining checks of parameters specified by the application. The parameters include an average compression ratio of the data over a first amount of time, a trend of the average compression ratio of the data, an average throughput over a second amount of time, a trend of the average throughput, and a round trip time of the data in the replication being sent from the first storage resource to the second storage resource. The method further includes the computer system determining respective high and low threshold values for the parameters. The method further includes the computer system executing at least one of the checks of the parameters, which determines a violation of a high or low threshold value for one of the parameters. The method further includes: (1) if the violation of the high threshold value is determined, the computer system triggering an increase in the bandwidth, or (2) if the violation of the low threshold value is determined, the computer system triggering a decrease in the bandwidth. The increase is a first specified amount associated with the high threshold value. The decrease is a second specified amount associated with the low threshold value.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of managing an allocation of a bandwidth of a dedicated channel in a network being utilized by an application performing a replication of data from a first storage resource to a second storage resource. The method includes the computer system determining checks of parameters specified by the application. The parameters include an average compression ratio of the data over a first amount of time, a trend of the average compression ratio of the data, an average throughput over a second amount of time, a trend of the average throughput, and a round trip time of the data in the replication being sent from the first storage resource to the second storage resource. The method further includes the computer system determining respective high and low threshold values for the parameters. The method further includes the computer system executing at least one of the checks of the parameters, which determines a violation of a high or low threshold value for one of the parameters. The method further includes: (1) if the violation of the high threshold value is determined, the computer system triggering an increase in the bandwidth, or (2) if the violation of the low threshold value is determined, the computer system triggering a decrease in the bandwidth. The increase is a first specified amount associated with the high threshold value. The decrease is a second specified amount associated with the low threshold value.

Embodiments of the present invention determine whether to increase or decrease bandwidth used by a data replication application based on current and/or expected demand, advantageously resulting in optimized bandwidth usage which decreases or prevents bandwidth over-provisioning and decreases costs incurred by a customer utilizing the data replication application.

DETAILED DESCRIPTION

Overview

Embodiments of the present invention provide a data mirroring application that exploits a programmable wide area network (WAN) and transport devices so that the cost and efficiency of data mirroring is optimized for industrial applications that require data replication. The data mirroring application is implemented so that replication occurs over a dedicated channel and so that there are no conflicts with competing entities in a data center. In one embodiment, a database replication application instructs a WAN bandwidth allocator as to when conditions are satisfied for dynamically allocating bandwidth and how much bandwidth is to be dynamically allocated based on the database replication application's current and/or predicted demand for bandwidth. Embodiments of the present invention utilize statistical analysis and probability to determine when to request more or less capacity for data mirroring or replication so that the requests for more capacity are sent ahead of when the additional capacity is actually needed, and requests for less capacity decreases capacity more gradually than the most recent previous increases. The more gradual decreases in capacity avoid a significant impact on the performance of the system by avoiding a repeated pattern of requesting additional bandwidth and then requesting to give up the additional bandwidth in a short time after the additional bandwidth request.

Known techniques for managing continuous data mirroring or data replication via a connection between data centers provision bandwidth in a sub-optimal manner. Providing an optimal provisioning of bandwidth based on current and/or projected demand for bandwidth is a unique challenge for industries that need real time replication of production data. This unique challenge is overcome by one or more embodiments of the present invention, which advantageously optimize bandwidth allocation for data replication to avoid over-provisioning and under-provisioning of bandwidth for data replication.

System for Managing Bandwidth Allocation for Data Replication

Figure 1:
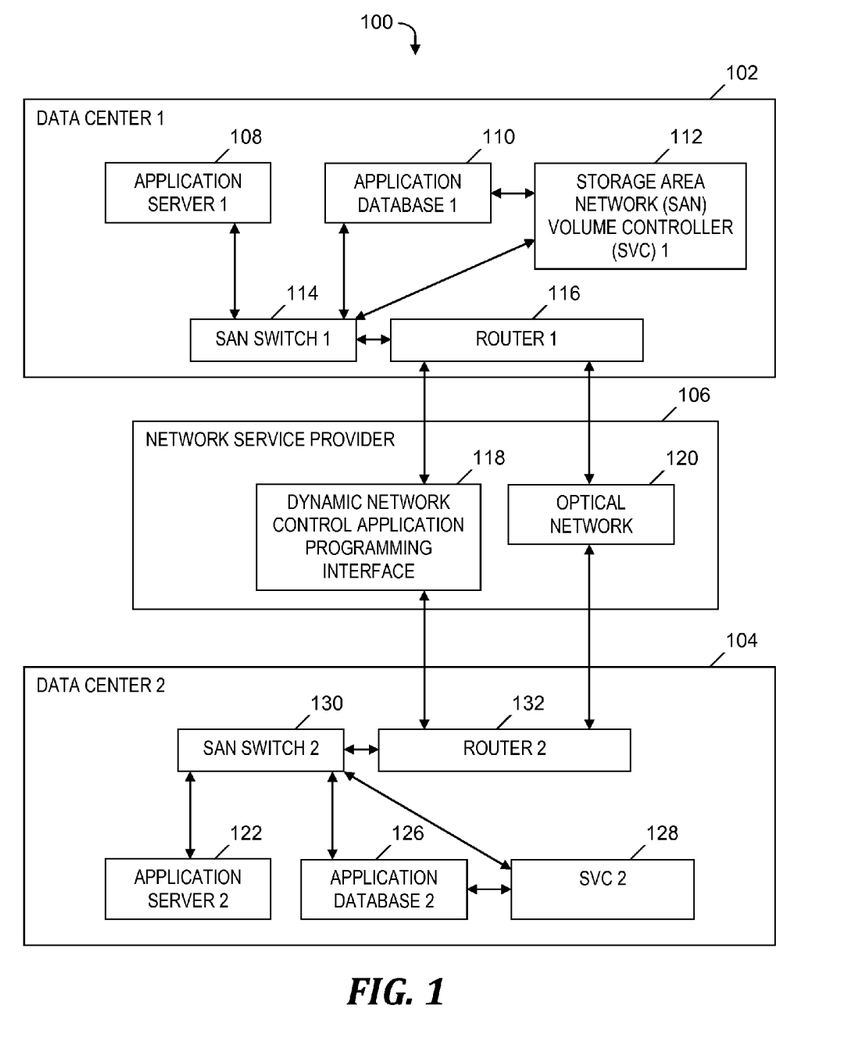
FIG. 1 is a block diagram of a system for managing an allocation of a bandwidth of a dedicated channel in a network being utilized by an application performing a replication of data from a first storage resource to a second storage resource, in accordance with embodiments of the present invention.

FIG. 1 is a block diagram of a system for managing an allocation of a bandwidth of a dedicated channel in a network being utilized by an application performing a replication of data from a first storage resource to a second storage resource, in accordance with embodiments of the present invention. System 100 provides data mirroring between a first data center 102 and a second data center 104, using a network service provider 106. The mirroring can be an asynchronous form of mirroring or mirroring resulting from a disconnection situation or a new database schema. In one embodiment, network service provider 106 provides a programmable WAN which is used for the data replication.

Data center 102 includes a first application server 108 (i.e., a computer), a first application database 110, a first storage area network (SAN) volume controller (SVC) 112 (i.e., a first storage resource), a first SAN switch 114 and a first router 116. In one embodiment, application server 108 or SVC 112 runs a data replication application that replicates data in first application database 110 from first SVC 112 via first SAN switch 114 and first router 116. The data replication application determines and informs a dynamic network control application programming interface (API) 118 about when and how much bandwidth should be allocated to the data replication, which utilizes a dedicated channel to second data center 104 via an optical network 120.

Optical network 120 is provided by network service provider 106. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first SAN switch 114 and first router 116 to the MPLS network.

Dynamic network control API 118 is executed by a transport device (not shown), which is managed by network service provider 106. Dynamic network control API 118 allows first SVC 112 to dynamically change bandwidth allocation from network service provider 106. Mirroring using known techniques and dedicated bandwidth is expensive. Embodiments presented herein disclose an approach to optimize bandwidth usage and the decrease the cost of bandwidth usage.

Second data center 104 includes a second application server 122 (i.e., a computer) which runs a data replication application that replicates data in second application database 126 from a second SVC 128 (i.e., a second storage resource) via a second SAN switch 130 and a second router 132. The data being replicated is transferred from first SVC 112 via first SAN switch 114 and first router 116 over optical network 120 to second SVC 128 via second router 132 and second SAN switch 130.

Figure 2:
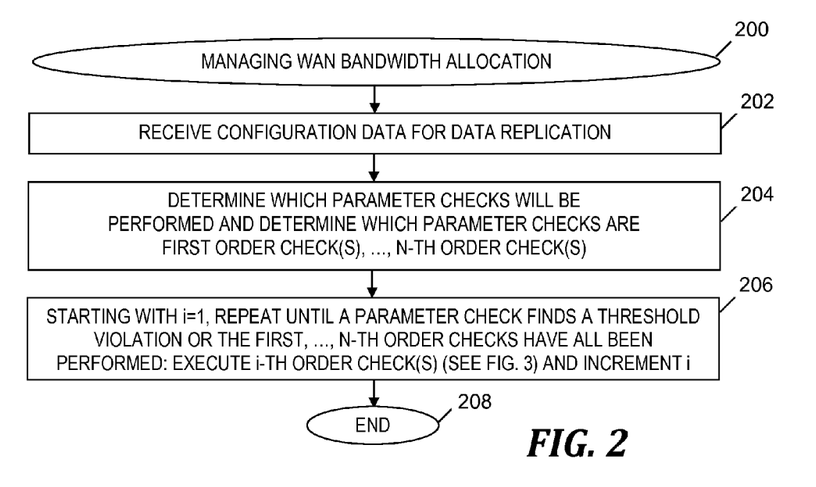
FIG. 2 is a flowchart of a process of managing an allocation of a bandwidth of a dedicated channel in a network being utilized by an application performing a replication of data from a first storage resource to a second storage resource, where the process is implemented in the system of FIG. 1, in accordance with embodiments of the present invention.
Figure 3:
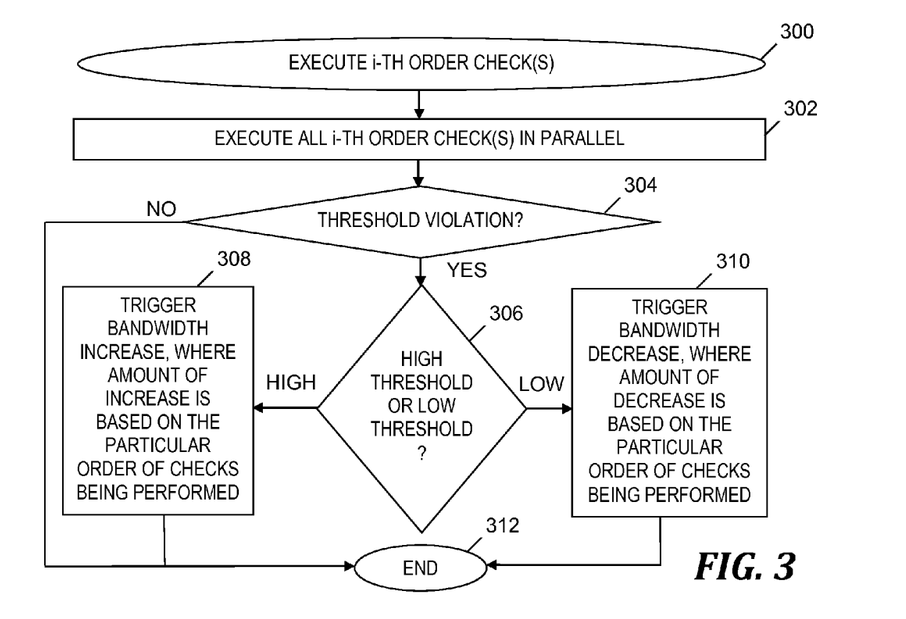
FIG. 3 is a flowchart of a process of executing parameter checks included in the process of FIG. 2, in accordance with embodiments of the present invention.
Figure 4:
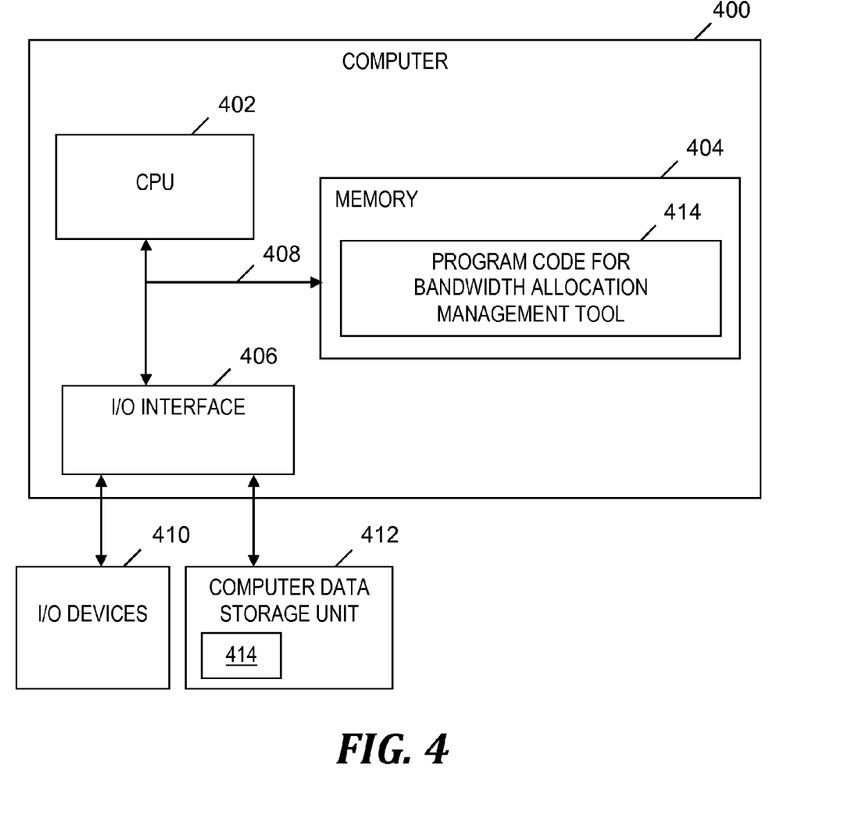
FIG. 4 is a block diagram of a computer that is included in the system of FIG. 1 and that implements the processes of FIG. 2 and FIG. 3, in accordance with embodiments of the present invention.

The functionality of the components shown in FIG. 1 is described in more detail in the discussion of FIG. 2, FIG. 3, and FIG. 4 presented below.

Process for Managing Bandwidth Allocation for Data Replication

FIG. 2 is a flowchart of a process of managing an allocation of a bandwidth of a dedicated channel in a network being utilized by an application performing a replication of data from a first storage resource to a second storage resource, where the process is implemented in the system of FIG. 1, in accordance with embodiments of the present invention. The process of FIG. 2 starts at step 200. In step 202, first SVC 112 (see FIG. 1) receives configuration data for data replication. The configuration data includes high threshold values and low threshold values for multiple orders of checks or parameters, amounts of bandwidth increases triggered by violations of respective high threshold values, and amounts of bandwidth decreases triggered by violations of respective low threshold values. For example, high and low threshold values indicate tolerances of round trip time and throughput that the data replication application can support.

In one embodiment, the parameters include (1) an average compression ratio of the data being replicated, where the average is taken over a first amount of time (e.g., 5 minutes), (2) a trend of the compression ratio of the data, (3) an average throughput of the data over a second amount of time (e.g., 5 minutes), where throughput is a rate of successful message delivery over the dedicated channel being used for the data replication, (4) a trend of the throughput, and (5) a round trip time of the data in the replication being sent from SVC 112 (see FIG. 1) to SVC 128 (see FIG. 1). In one embodiment, the trend of the average compression ratio violates a corresponding threshold if a current compression ratio exceeds the average compression ratio+3*(standard deviation of the compression ratio). In one embodiment, the trend of the throughput violates a corresponding threshold if a current throughput exceeds the average throughput+3* (standard deviation of the throughput).

In other embodiments, the parameters include the aforementioned parameters and one or more of the following parameters: (1) an amount of network buffers in an input/output (I/O) device being used in the replication of the data; (2) buffer credits remaining on SVC 128 (see FIG. 1) (i.e., the second storage resource), where buffer credits indicate the buffer space remaining no SVC 128 (see FIG. 1) to queue up requests for the data replication; (3) a transfer time required to transfer the data from SVC 112 (see FIG. 1) to SVC 128 (see FIG. 1); (4) an amount of new data included in the data being transferred in the replication of the data, (5) a response time of a communication port of the I/O device; and (6) a recovery point objective for the data being replicated.

In an alternate embodiment, the parameters consist of (1) buffer credits remaining on SVC 128 (see FIG. 1); (2) the change rate (i.e., frequency that the data changes on SVC 112 (see FIG. 1) which require replicating the changes to SVC 128 (see FIG. 1); (3) compression ratio; and (4) current utilization of the connection being used for the data replication.

These embodiments advantageously utilize the aforementioned additional parameter checks (1) through (6) to more accurately determine current and expected demand for bandwidth for the data replication, thereby making the current and expected demand a more accurate basis for dynamically allocating bandwidth to avoid over-provisioning and under-provisioning the bandwidth.

In step 204, first SVC 112 (see FIG. 1) determines which parameter checks will be performed to check whether values of parameters specified by the data replication application running on first application server 108 (see FIG. 1) or SVC 112 (see FIG. 1) exceed respective high threshold values or are less than respective low threshold values. Step 204 also includes first SVC 112 (see FIG. 1) determining which one or more of the parameter checks are first order check(s), second order check(s), . . . , N-th order check(s), where N is an integer greater than or equal to two. The first order check(s), second order check(s), . . . , N-th order check(s) are a series of N mutually exclusive sets of the parameter checks which are determined in step 204. The series of N sets is ordered from greatest to least amounts of increases of the bandwidth associated with violations of the respective high threshold values and from greatest to least amounts of decreases of the bandwidth associated with violations of respective low threshold values.

In step 206, first SVC 112 (see FIG. 1) starts with i=1 and repeats the following steps until (1) the execution of a parameter check finds a threshold violation or (2) all the parameter checks in the first through N-th order check(s) have been performed: execute the i-th order check(s) (as presented below in the discussion of FIG. 3) and increment i to become i+1. The process of FIG. 2 ends at step 208.

FIG. 3 is a flowchart of a process of executing i-th order checks included in the process of FIG. 2, in accordance with embodiments of the present invention. The process of FIG. 3 starts at step 300. In step 302, using the first order check(s), . . . , N-th order check(s) determined in step 204 (see FIG. 2), first SVC 112 (see FIG. 1) selects the i-th order check(s) and executes all the i-th order check(s) in parallel.

In step 304, SVC 112 (see FIG. 1) determines whether a threshold violation occurred as a result of executing the i-th order checks in step 302. If SVC 112 (see FIG. 1) determines in step 304 that a threshold violation occurred, then the Yes branch of step 304 is taken and step 306 is performed.

In step 306, SVC 112 (see FIG. 1) determines whether the threshold violation is a violation of a high threshold value or a low threshold value. If SVC 112 (see FIG. 1) determines in step 306 that a violation of a high threshold value occurred, then the High branch of step 306 is taken and step 308 is performed.

In step 308, SVC 112 (see FIG. 1) sends a message to dynamic network control API 118 (see FIG. 1) to trigger an increase in the bandwidth of a dedicated channel in optical network 120 (see FIG. 1), as provided by network service provider 106 (see FIG. 1). The increase in the bandwidth advantageously avoids a slowdown of the data replication application as a result of the increase in the current and/or expected demand.

Returning to step 306, if SVC 112 (see FIG. 1) determines that a violation of a low threshold value occurred, then the Low branch of step 306 is taken and step 310 is performed. In step 310, SVC 112 (see FIG. 1) sends a message to dynamic network control API 118 (see FIG. 1) to trigger an decrease in the bandwidth of the dedicated channel in optical network 120 (see FIG. 1), as provided by network service provider 106 (see FIG. 1). The decrease in the bandwidth advantageously reduces the cost of the replication by avoiding an over-provisioned bandwidth situation in which a customer pays for bandwidth that is not actually used for the data replication.

Following step 308 and step 310, the process of FIG. 3 ends at step 312.

Returning to step 304, if SVC 112 (see FIG. 1) determines that a threshold violation did not occur as a result of the i-th order checks executed in step 302, then the No branch of step 304 is taken and the process of FIG. 3 ends at step 312.

In other embodiments, the parameters whose checks are determined in step 204 (see FIG. 2) include an amount of bandwidth required to complete the replication. SVC 112 (see FIG. 1) receives in step 202 (see FIG. 2) a limit on the bandwidth for the replication and a time window within which the replication is required to be completed. SVC 112 (see FIG. 1) determines the amount of bandwidth required to complete the replication and determines whether the amount of bandwidth required to complete the replication exceeds the limit in step 304. If the amount of bandwidth required to complete the replication exceeds the limit, SVC 112 (see FIG. 1) sends an alert of the limit being exceeded. In response to the alert being sent, SVC 112 (see FIG. 1) triggers an increase in the limit by dynamic network control API 118 (see FIG. 1) in step 308 so that the amount of bandwidth required to complete the replication does not exceed the increased limit. In one embodiment, SVC 112 (see FIG. 1) determines a look ahead value of a compression ratio for the data in a future time period of the replication, where determining whether the amount of bandwidth required to complete the replication exceeds the limit is based on the look ahead value of the compression ratio.

Examples of triggering changes in the bandwidth in step 308 or 310 include: (1) if the average compression ratio <2:1, then request a WAN capacity increase; (2) if the trend of the compression ratio >2:1, increase the WAN capacity; (3) if the throughput is 80% or more of the available pipe, then decrease the WAN bandwidth settings; (4) if the throughput trending is 90% or more of the available pipe, then decrease the WAN bandwidth settings; (5) if the round trip time >70 milliseconds, then decrease the SVC bandwidth settings; and (6) if the throughput trending is less than 60% of bandwidth, then increase the SVC bandwidth settings.

Computer System

FIG. 4 is a block diagram of a computer that is included in the system of FIG. 1 and that implements the processes of FIG. 2 and FIG. 3, in accordance with embodiments of the present invention. Computer 400 is a computer system that generally includes a central processing unit (CPU) 402, a memory 404, an input/output (I/O) interface 406, and a bus 408. Further, computer 400 is coupled to I/O devices 410 and a computer data storage unit 412. In one embodiment, computer 400 is first application server 108 (see FIG. 1), or alternatively, a computing device that includes SVC 112 (see FIG. 1). CPU 402 performs computation and control functions of computer 400, including carrying out instructions included in program code 414 to perform a method of managing an allocation of a bandwidth of a dedicated channel in a network being utilized by an application performing a replication of data from a first storage resource to a second storage resource, where the instructions are carried out by CPU 402 via memory 404. CPU 402 may include a single processing unit, or be distributed across one or more processing units in one or more locations (e.g., on a client and server). In one embodiment, program code 414 is executed by application server 108 (see FIG. 1), or alternatively by SVC 112 (see FIG. 1).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 400, and may include any type of transmission link, including electrical, optical, wireless, etc.

I/O interface 406 also allows computer 400 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to manage an allocation of a bandwidth of a dedicated channel in a network being utilized by an application performing a replication of data from a first storage resource to a second storage resource. Although FIG. 4 depicts memory 404 as including program code 414, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 400 may store the content of configuration data received in step 202 (see FIG. 2).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to managing an allocation of a bandwidth of a dedicated channel in a network being utilized by an application performing a replication of data from a first storage resource to a second storage resource. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 400) including one or more processors (e.g., CPU 402), wherein the processor(s) carry out instructions contained in the code causing the computer system to manage an allocation of a bandwidth of a dedicated channel in a network being utilized by an application performing a replication of data from a first storage resource to a second storage resource. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing an allocation of a bandwidth of a dedicated channel in a network being utilized by an application performing a replication of data from a first storage resource to a second storage resource.

While it is understood that program code 414 for managing an allocation of a bandwidth of a dedicated channel in a network being utilized by an application performing a replication of data from a first storage resource to a second storage resource may be deployed by manually loading directly in client, server and proxy computers (not shown) via loading a computer-readable storage medium (e.g., computer data storage unit 412), program code 414 may also be automatically or semi-automatically deployed into computer 400 by sending program code 414 to a central server or a group of central servers. Program code 414 is then downloaded into client computers (e.g., computer 400) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing an allocation of a bandwidth of a dedicated channel in a network being utilized by an application performing a replication of data from a first storage resource to a second storage resource. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 400). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 400) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 400) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 400), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing an allocation of a bandwidth of a dedicated channel in a network being utilized by an application performing a replication of data from a first storage resource to a second storage resource, the method comprising:
    determining checks of parameters specified by the application, the parameters including an average compression ratio of the data over a first amount of time, a trend of the average compression ratio of the data, an average throughput over a second amount of time, a trend of the average throughput, and a round trip time of the data in the replication being sent from the first storage resource to the second storage resource;
    determining respective high and low threshold values for the parameters of at least one of the checks of parameters;
    executing the at least one of the checks of the parameters during the replication of data from the first storage resource to the second storage resource, the executing determining a violation of a high or low threshold value during the replication for one parameter of the parameters of the at least one of the checks of parameters; and
    based on determining the violation of the high threshold value, triggering, during the replication an increase in the bandwidth, the increase being a first specified amount associated with the high threshold value, or based on determining the violation of the low threshold value, triggering, during the replication, a decrease in the bandwidth, the decrease being a second specified amount associated with the low threshold value.

2. The method of claim 1, further comprising:
    based on executing the at least one of the checks of the parameters, determining the violation of the high threshold value, which indicates an increase in a current demand or an expected demand for the bandwidth; and based on triggering the increase in the bandwidth, sending a request to a transport device of a network service provider to dynamically increase the bandwidth during the replication, which avoids a slowdown of the application as a result of the increase in the current or expected demand.

3. The method of claim 1, further comprising:
based on executing the at least one of the checks of the parameters, determining the violation of the low threshold value, which indicates a decrease in a current demand or an expected demand for the bandwidth; and
based on triggering the decrease in the bandwidth, sending a request to a transport device of a network service provider to dynamically decrease the bandwidth during the replication, which avoids an over-provisioning of the bandwidth as a result of the decrease in the current or expected demand, and which reduces a cost of the replication.

4. The method of claim 1, wherein the parameters of the determined checks of parameters, further include an amount of network buffers in an input/output (I/O) device being used in the replication, buffer credits remaining on the second storage resource, a transfer time required to move the data from the first storage resource to the second storage resource, an amount of new data included in the data being transferred in the replication, a response time of a communication port of the I/O device, and a recovery point objective for the data.

5. The method of claim 1, further comprising:
receiving a limit on the bandwidth for the replication and receiving a time window within which the replication is required to be completed;
determining an amount of bandwidth required to complete the replication;
determining whether the amount of bandwidth required to complete the replication exceeds the limit; and
based on the amount of bandwidth required to complete the replication exceeding the limit, sending an alert of the limit being exceeded.

6. The method of claim 5, further comprising, based on the alert being sent, receiving a request to increase the limit and, based on the request being received, increasing the limit so that the amount of bandwidth required to complete the replication does not exceed the increased limit.

7. The method of claim 5, further comprising determining a look ahead value of a compression ratio for the data in a future time period of the replication, wherein the determining whether the amount of bandwidth required to complete the replication exceeds the limit is based on the look ahead value of the compression ratio.

8. The method of claim 1, further comprising:
determining a series of N mutually exclusive sets of the parameters, N being an integer greater than or equal to two, and the series being ordered from greatest to least amounts of increases of the bandwidth associated with violations of the respective high threshold values and from greatest to least amounts of decreases of the bandwidth associated with violations of the respective low threshold values
wherein the executing the at least one of the checks of the parameters executes one or more checks of one or more parameters in a set included in the series of N mutually exclusive sets; and
determining whether a violation of the high or low threshold value of a parameter in the set occurs, and (1) if the violation of the high threshold value occurs, triggering the increase in the bandwidth without repeating executing the one or more checks for a next set included in the series of N mutually exclusive sets, (2) if the violation of the low threshold value occurs, triggering the decrease in the bandwidth without repeating executing the one or more checks for the next set included in the series of N mutually exclusive sets, or (3) if no violation of the high or low threshold value occurs, repeating (i) executing the one or more checks for the next set included in the series of N mutually exclusive sets and (ii) determining whether a violation of the high or low threshold value of a parameter in the next set occurs based on the one or more checks for the next set.

9. A computer program product, comprising:
a computer-readable, storage device; and
a computer-readable program code stored in the computer-readable storage device, the computer-readable program code containing instructions for execution by a central processing unit (CPU) of a computer system to implement a method of managing an allocation of a bandwidth of a dedicated channel in a network being utilized by an application performing a replication of data from a first storage resource to a second storage resource, the method comprising:
determining checks of parameters specified by the application, the parameters including an average compression ratio of the data over a first amount of time, a trend of the average compression ratio of the data, an average throughput over a second amount of time, a trend of the average throughput, and a round trip time of the data in the replication being sent from the first storage resource to the second storage resource;
determining respective high and low threshold values for the parameters of at least one of the checks of parameters;
executing the at least one of the checks of the parameters during the replication of data from the first storage resource to the second storage resource, the executing determining a violation of a high or low threshold value during the replication for one parameter of the parameters of the at least one of the checks of parameters; and
based on determining the violation of the high threshold value triggering, during the replication, an increase in the bandwidth, the increase being a first specified amount associated with the high threshold value, or based on determining the violation of the low threshold value, triggering, during the replication, a decrease in the bandwidth, the decrease being a second specified amount associated with the low threshold value.

10. The computer program product of claim 9, wherein the method further comprises:
based on executing the at least one of the checks of the parameters, determining the violation of the high threshold value, which indicates an increase in a current demand or an expected demand for the bandwidth; and
based on triggering the increase in the bandwidth, sending a request to a transport device of a network service provider to dynamically increase the bandwidth during the replication, which avoids a slowdown of the application as a result of the increase in the current or expected demand.

11. The computer program product of claim 9, wherein the method further comprises:

based on executing the at least one of the checks of the parameters, determining the violation of the low threshold value, which indicates a decrease in a current demand or an expected demand for the bandwidth; and based on triggering the decrease in the bandwidth, sending a request to a transport device of a network service provider to dynamically decrease the bandwidth during the replication, which avoids an over-provisioning of the bandwidth as a result of the decrease in the current or expected demand, and which reduces a cost of the replication.

12. The computer program product of claim 9, wherein the parameters of the determined checks of parameters further include an amount of network buffers in an input/output (I/O) device being used in the replication, buffer credits remaining on the second storage resource, a transfer time required to move the data from the first storage resource to the second storage resource, an amount of new data included in the data being transferred in the replication, a response time of a communication port of the I/O device, and a recovery point objective for the data.

13. The computer program product of claim 9, further comprising:
receiving a limit on the bandwidth for the replication and receiving a time window within which the replication is required to be completed;
determining an amount of bandwidth required to complete the replication;
determining whether the amount of bandwidth required to complete the replication exceeds the limit; and
based on the amount of bandwidth required to complete the replication exceeding the limit, sending an alert of the limit being exceeded.

14. The computer program product of claim 13, wherein the method further comprises based on the alert being sent, receiving a request to increase the limit and, based on the request being received, increasing the limit so that the amount of bandwidth required to complete the replication does not exceed the increased limit.

15. A computer system comprising:
a central processing unit (CPU);
a memory coupled to the CPU; and
a computer readable storage device coupled to the CPU, the storage device containing instructions for executing by the CPU via the memory to implement a method of managing an allocation of a bandwidth of a dedicated channel in a network being utilized by an application performing a replication of data from a first storage resource to a second storage resource, the method comprising:
determining checks of parameters specified by the application, the parameters including an average compression ratio of the data over a first amount of time, a trend of the average compression ratio of the data, an average throughput over a second amount of time, a trend of the average throughput, and a round trip time of the data in the replication being sent from the first storage resource to the second storage resource;
determining respective high and low threshold values for the parameters of at least one of the checks of parameters;
executing the at least one of the checks of the parameters during the replication of data from the first storage resource to the second storage resource, the executing determining a violation of a high or low threshold value during the replication for one parameter of the parameters of the at least one of the checks of parameters; and based on determining the violation of the high threshold value, triggering, during the replication, an increase in the bandwidth, the increase being a first specified amount associated with the high threshold value, or based on the violation of the low threshold value, triggering, during the replication, a decrease in the bandwidth, the decrease being a second specified amount associated with the low threshold value.

16. The computer system of claim 15, wherein the method further comprises:
based on executing the at least one of the checks of the parameters, determining the violation of the high threshold value, which indicates an increase in a current demand or an expected demand for the bandwidth; and
based on triggering the increase in the bandwidth, sending a request to a transport device of a network service provider to dynamically increase the bandwidth during the replication, which avoids a slowdown of the application as a result of the increase in the current or expected demand.

17. The computer system of claim 15, wherein the method further comprises:
based on executing the at least one of the checks of the parameters, determining the violation of the low threshold value, which indicates a decrease in a current demand or an expected demand for the bandwidth; and
based on triggering the decrease in the bandwidth, sending a request to a transport device of a network service provider to dynamically decrease the bandwidth during the replication, which avoids an over-provisioning of the bandwidth as a result of the decrease in the current or expected demand, and which reduces a cost of the replication.

18. The computer system of claim 15, wherein the parameters of the determined checks of parameters further include an amount of network buffers in an input/output (I/O) device being used in the replication, buffer credits remaining on the second storage resource, a transfer time required to move the data from the first storage resource to the second storage resource, an amount of new data included in the data being transferred in the replication, a response time of a communication port of the I/O device, and a recovery point objective for the data.

19. The computer system of claim 15, further comprising:
receiving a limit on the bandwidth for the replication and receiving a time window within which the replication is required to be completed;
determining an amount of bandwidth required to complete the replication;
determining whether the amount of bandwidth required to complete the replication exceeds the limit; and
based on the amount of bandwidth required to complete the replication exceeding the limit, sending an alert of the limit being exceeded.

20. The computer program product of claim 19, wherein the method further comprises, based on the alert being sent, receiving a request to increase the limit and, based on the request being received, increasing the limit so that the amount of bandwidth required to complete the replication does not exceed the increased limit.

* * * * *